United States Patent
Keese et al.

(10) Patent No.: US 8,670,356 B1
(45) Date of Patent: Mar. 11, 2014

(54) FAST FREQUENCY HOPPING FULL-DUPLEX RADIO

(75) Inventors: William Keese, Kirkland, WA (US); Michael Summers, Carnation, WA (US)

(73) Assignee: Broadcom Corporation, Irvine, CA (US)

( * ) Notice: Subject to any disclaimer, the term of this patent is extended or adjusted under 35 U.S.C. 154(b) by 852 days.

(21) Appl. No.: 11/715,673

(22) Filed: Mar. 7, 2007

Related U.S. Application Data (60) Provisional application No. 60/858,016, filed on Nov. 9, 2006.

(51) Int. Cl.
*H04B 7/00* (2006.01)
*H04J 1/00* (2006.01)
*H04B 1/38* (2006.01)

(52) U.S. Cl.
USPC ............. 370/277; 370/343; 370/480; 455/73

(58) Field of Classification Search
USPC ............. 370/296; 375/132–134, 138; 455/73, 455/78, 83
See application file for complete search history.

(56) References Cited

U.S. PATENT DOCUMENTS

| | | | |
|---|---|---|---|
| 5,428,602 A * | 6/1995 | Kemppainen | 370/330 |
| 6,560,443 B1 * | 5/2003 | Vaisanen et al. | 455/73 |
| 6,788,729 B1 * | 9/2004 | Posti | 375/133 |
| 2002/0082047 A1 * | 6/2002 | Souissi et al. | 455/557 |
| 2003/0013475 A1 * | 1/2003 | Yoshimura | 455/522 |
| 2004/0213355 A1 * | 10/2004 | Morton et al. | 375/289 |
| 2006/0019621 A1 * | 1/2006 | Yamaguchi | 455/127.1 |
| 2006/0104333 A1 * | 5/2006 | Rainbolt et al. | 375/132 |
| 2007/0150723 A1 * | 6/2007 | Estable et al. | 713/155 |
| 2007/0161401 A1 * | 7/2007 | Sheynblat | 455/553.1 |
| 2007/0165754 A1 * | 7/2007 | Kiukkonen et al. | 375/346 |
| 2007/0194906 A1 * | 8/2007 | Sink | 340/506 |
| 2007/0238483 A1 * | 10/2007 | Boireau et al. | 455/553.1 |
| 2007/0293222 A1 * | 12/2007 | Vikberg et al. | 455/436 |

* cited by examiner

*Primary Examiner* — Omar Ghowrwal
(74) *Attorney, Agent, or Firm* — Sterne, Kessler, Goldstein & Fox P.L.L.C.

(57) ABSTRACT

A system for radio communication is disclosed. The radio system includes a plurality of radio transceivers and a switch. Each transceiver cannot be used alone to meet an operational requirement. The switch configured to switch between the plurality of transceivers to provide the operational requirement.

24 Claims, 8 Drawing Sheets

FAST FREQUENCY HOPPING FULL-DUPLEX RADIO

This application claims priority to U.S. Provisional Patent Application No. 60/858,016 entitled FAST FREQUENCY HOPPING FULL-DUPLEX RADIO filed Nov. 9, 2006 which is incorporated herein by reference for all purposes.

BACKGROUND OF THE INVENTION

Many radio communication devices use one or more radio transceivers to send and receive signals. Radio transceivers of popular configurations are available as off-the-shelf components. Typically if an off-the-self transceiver cannot be used to meet a desired transceiver specification, a radio transceiver is custom designed to meet the desired transceiver specification. However, custom designed radio transceivers are often more costly to implement and build than off-the-self transceivers. Therefore, there exists a need for a way to reduce the use of custom designed transceivers.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Due to high market demand for cellular handsets, radio transceivers used in mobile handsets have become increasing inexpensive over the years. Despite its low cost, the transceiver chips typically used in GSM and other pre-3G mobile handsets have not been used in many other communication devices due to the half-duplex signal transmission limitation of such chips and the long setup time required to shift between frequencies and/or gain levels.

Figure 1A:
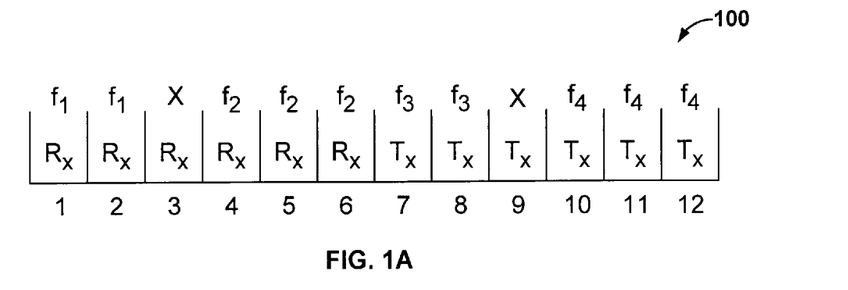
FIG. 1A is a diagram illustrating an example of radio communication timeslots used by a half-duplex transceiver limited by long frequency hopping setup time.

FIG. 1A is a diagram illustrating an example of radio communication timeslots used by a half-duplex transceiver limited by long frequency hopping setup time. Transmission sequence 100 shows a total of 12 transmission slots. Slots 1-6 show the transceiver receiving a signal, and slots 7-12 show the transceiver transmitting a signal. Since the transceiver is half-duplex, the transceiver cannot be both sending and receiving a signal at the same time. Due to the long frequency hopping setup time, a blind spot (e.g., an instance when any signal cannot be received or transmitted) is created when either the receive or transmission frequency is changed. When the receive frequency is changed from f1 to f2 in the example shown in FIG. 1A, a blind spot is created in slot 3 since the transceiver cannot receive or transmit any signal while setting up to receive f2. When transmit frequency is changed from f3 to f4 in the example shown, a blind spot is created in slot 9 since the transceiver cannot receive or transmit any signal while changing the transmit frequency. In some cases, transceiver gain levels needs to be adjusted to compensate for different strengths of received signals. Due to the long gain level change setup time, the transceiver can be delayed from receiving a signal while changing gain levels.

A full-duplex transceiver with no blind spot frequency hopping and/or fast gain level change, constructed using two or more non-full-duplex transceiver chips, is disclosed. In some embodiments, a plurality of half-duplex transceivers that do not meet an operational requirement for switching between transmit/receive frequencies are used to achieve full-duplex communication with the required frequency hopping performance and/or gain level change performance. For example, one half-duplex transceiver is used to transmit a signal while another half-duplex transceiver is used for receive another signal at the same time. To achieve faster frequency hopping and/or gain level change than the chips can achieve individually, in some embodiments transmit and/or receive functionality is switched, as applicable, between at least two transceivers. For example, while an active first transceiver is receiving a signal in the original frequency and/or gain level, a non-active second transceiver prepares to receive a signal in a specified new frequency and/or gain level. When it becomes time to receive the signal in the new frequency and/or gain level, the second transceiver is switched active and used to receive the signal in the new frequency and/or gain level while the first transceiver is switched non-active. When the next frequency hop and/or gain level change is required, the first transceiver prepares for the next frequency hop and/or gain level change, and the prepared first transceiver is switched active while the second transceiver is switched non-active.

Figure 1B:
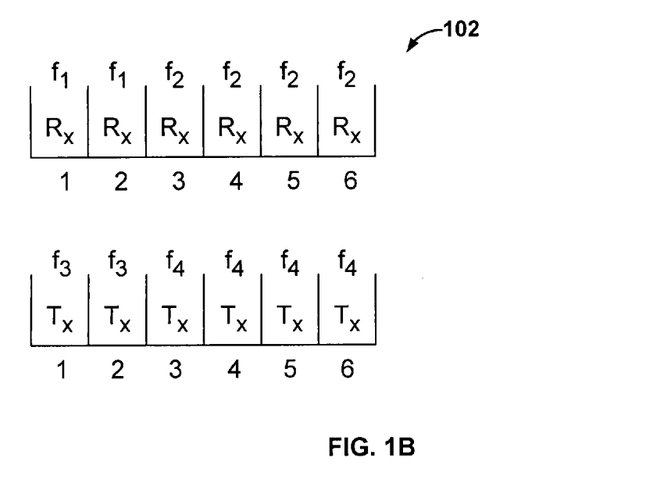
FIG. 1B is a diagram illustrating an example of radio communication timeslots in a communication of a full-duplex transceiver with no blind spot frequency hopping.

FIG. 1B is a diagram illustrating an example of radio communication timeslots in a communication of a full-duplex transceiver with no blind spot frequency hopping. Transmission sequence 102 shows full-duplex communication as the transceiver both receives and transmits signals during slot 1-6. When both the receive and transmit frequencies are changed between slots 2 and 3, the frequency change setup duration time is short enough to prevent a blind spot from being created. In some cases, a transceiver gain level is changed between slots 2 and 3 in addition to and/or instead of the frequency changes. The gain level change time is small enough to enable fast gain level changes.

In some embodiments, the result illustrated in FIG. 1B is achieved using four GSM handset transceiver chips that are not configured to provide full-duplex communication and have a frequency change setup time that does not meet an applicable operational requirement. Two transceivers (TRX) are used to receive (and in some embodiments the transmit portion of these transceivers is not used), and two other transceivers are used to transmit (and in some embodiments the receive portion of these latter transceivers is not used). The sequence shown in FIG. 1B is achieved, for example, by having a first receive TRX receive at f1, during slots 1 and 2 in the example shown, while a second receive TRX prepares to receive at f2, so that by the time the need to receive at f2 arrives (at slot 3 in this example) the second receive TRX is ready to receive at that frequency. Similarly, a first transmit TRX transmits at f3 while a second transmit TRX is set up to transmit at f4. In this way, the result shown in FIG. 1B is achieved using inexpensive, commodity handset chips that are not capable and/or configured to support full duplex communication and could not individually shift between frequencies fast enough to achieve the performance shown.

In some embodiments, fast transceiver gain level change is achieved using four GSM handset transceiver chips that are not configured to provide full-duplex communication and have a gain level change setup time that does not meet an applicable operational requirement. For example, by having a first receive TRX receive at a first gain level, during time slots 1 and 2, while a second receive TRX prepares to receive at a second gain level, so that by the time the need to receive at the second gain level arrives (at time slot 3 for example) the second receive TRX is ready to receive at the second gain level. In this way, the fast gain level change is achieved using inexpensive, commodity handset chips that are not capable and/or configured to support full duplex communication and could not individually shift between gain levels fast enough to achieve required performance.

Figure 2:
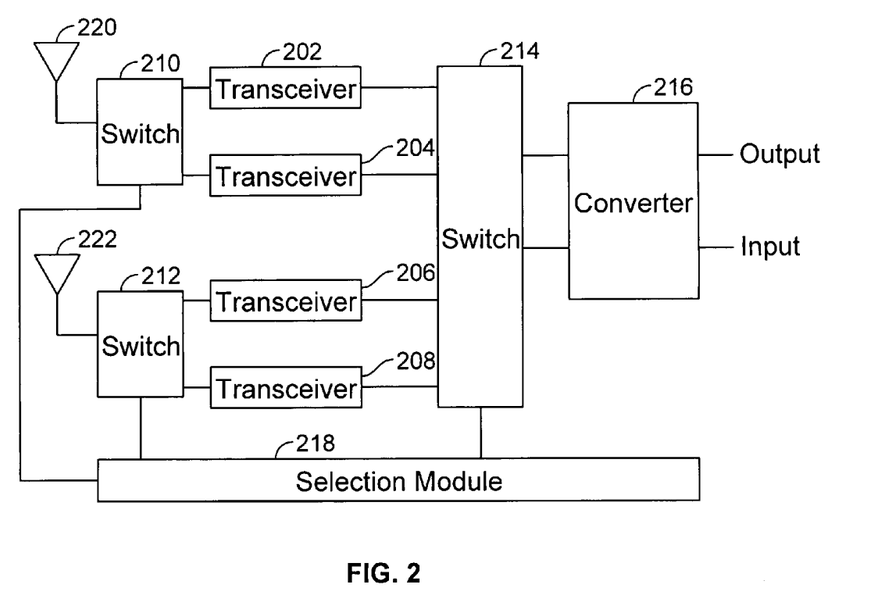
FIG. 2 is a block diagram illustrating an embodiment of a radio.

FIG. 2 is a block diagram illustrating an embodiment of a radio. In some embodiments, the radio is included in a Base Transceiver Station (BTS) or other base station of a cellular communication network. In some embodiment, the base station is a small scale base station, such as one suitable for deployment in a home or small enterprise setting. The radio shown includes four transceiver modules 202, 204, 206, and 208. The transceiver modules are half-duplex and/or are not capable and/or configured to hop between frequencies and/or change gains levels fast enough to meet a desired and/or required operational performance. For example, a base station may be required to communicate with multiple mobile stations (MS), for example cell phones, at the same time, and to shift quickly between transmit/receive frequencies and/or change quickly between gain levels in order to do so. In some embodiments, the transceiver modules are quad-band RF transceiver modules designed for use in GSM (i.e., Global System for Mobile communication), GPRS (i.e., General Packet Radio Service), and/or EDGE (i.e., Enhanced Data rates for Global Evolution) mobile stations. In various embodiments, the transceiver modules are available as off-the-shelf components. For example, each of the transceiver modules is available as a single integrated chip. Each transceiver module includes one or more transceivers. To enable full-duplex communication, transceiver modules 202 and 204 can be used to receive signals though receive antenna 220 while transceiver modules 206 and 208 are simultaneously used for transmitting signals through transmit antenna 222. In some embodiments, the receive and transmit signals are combined through a single antenna via a duplexer or isolator.

To achieve faster frequency hopping and/or gain level change than the chips are capable of and/or configured to achieve individually, antenna signal receive functionality is switched between signal receiving transceiver modules 202 and 204 each time a receive frequency is hopped and/or a gain level is changed. While one of transmit transceiver modules 202 and 204 is receiving a signal from antenna 220, the other transceiver module cannot be receiving a signal from antenna 220. The transceiver module not receiving a signal prepares to receive a new frequency and/or new gain level, if any, while the other transceiver module can be receiving a signal. Once the transceiver module not receiving a signal is ready to receive the new frequency and/or the new gain level and a signal in the new frequency/gain level is desired to be received, the signal receiving role of one transceiver module and the new receive frequency setup role of the other transceiver module are switched between the signal receiving transceiver modules. Likewise, transmit functionality is switched between signal transmitting transceiver modules 206 and 208 to eliminate blind spots when hopping transmit frequencies. While one of transceiver modules 206 and 208 is transmitting a signal using antenna 222, the other transceiver module cannot be transmitting a signal using antenna 222. The transceiver module not transmitting a signal prepares to transmit a new frequency, if any, while the other transceiver module can be transmitting a signal. Once the transceiver module not transmitting a signal is ready to transmit the new frequency and a signal in the new frequency is desired to be transmitted, the signal transmitting role of one transceiver module and the new transmit frequency setup role of the other transceiver module are switched between the signal transmitting transceiver modules.

Converter 216 converts signals from analog-to-digital and from digital-to-analog. In various embodiments, converter 216 performs other processing such as filtering. In some embodiments, output of converter 216 is provided as input to a baseband processing module. In some embodiments, input to converter 216 is from a baseband processing module. Selection module 218 appropriately signals switches 210, 212, and 214 to configure the radio to allow full-duplex communication and/or no blind spot frequency hopping. In some embodiments, selection module 218 includes and/or is controlled by one or more of the following: a digital signal processor (DSP) and a microprocessor. Each of switches 210, 212, and 214 includes one or more internal switches and may include other components. The example shown in the Figure has been simplified to illustrate the embodiment clearly. One or more of the components shown in the Figure may be optional and/or additional radio components such as filters and buffers may exist.

In the figure shown, four transceiver modules have been used to provide both full-duplex communication and no blind spot frequency hopping and/or fast gain level change. In some embodiments, three transceiver modules are used to provide full-duplex communication and no blind spot frequency hopping and/or fast gain level change during signal receive or transmit. In some embodiments, full-duplex communication, or no blind spot frequency hopping, or fast gain level change, and not all, is provided using two transceivers. In some embodiments, only one of the following is provided using two transceivers: full-duplex communication, no blind spot frequency hopping, and fast gain level change. In some embodiments, more than four transceiver modules are used.

Figure 3A:
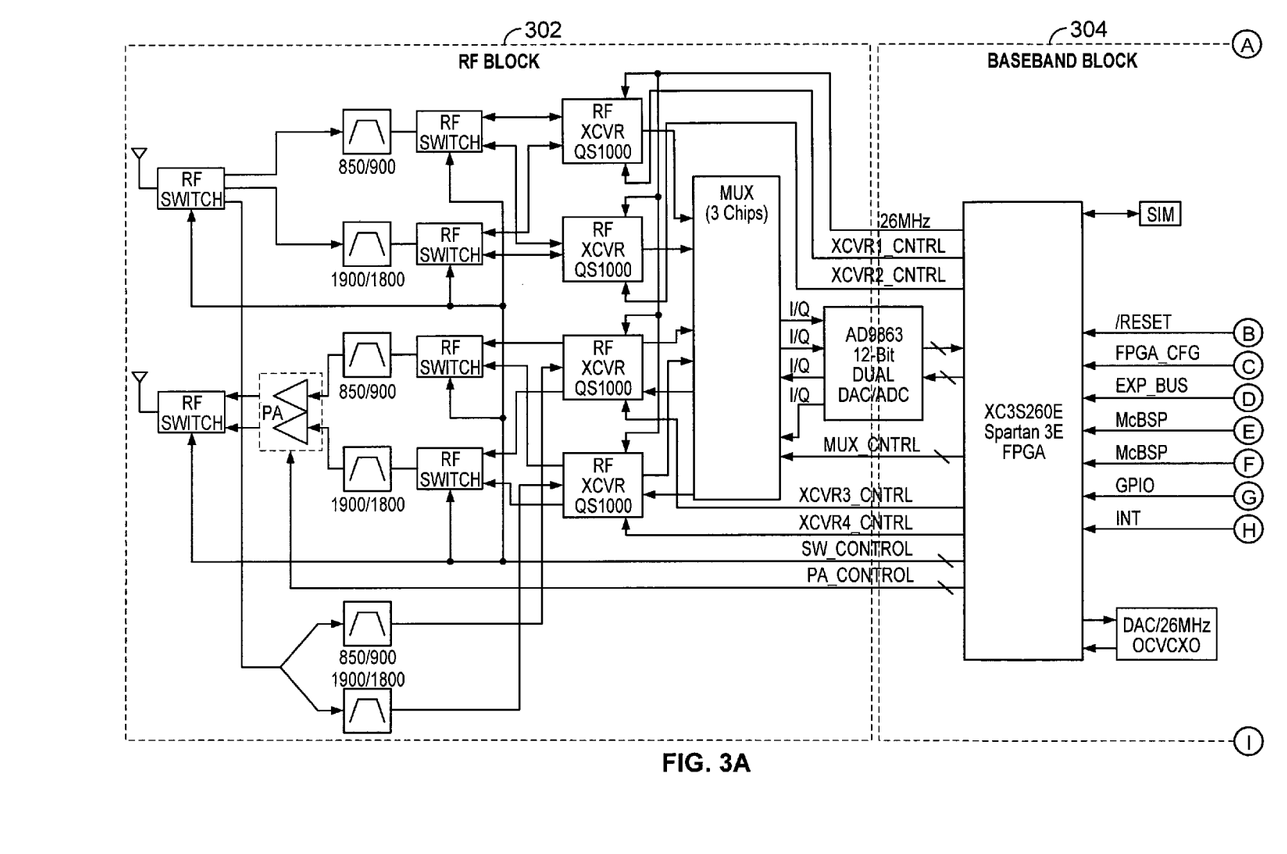
FIGS. 3A-3B is a block diagram illustrating an embodiment of at least a portion of a radio equipment.
Figure 3B:
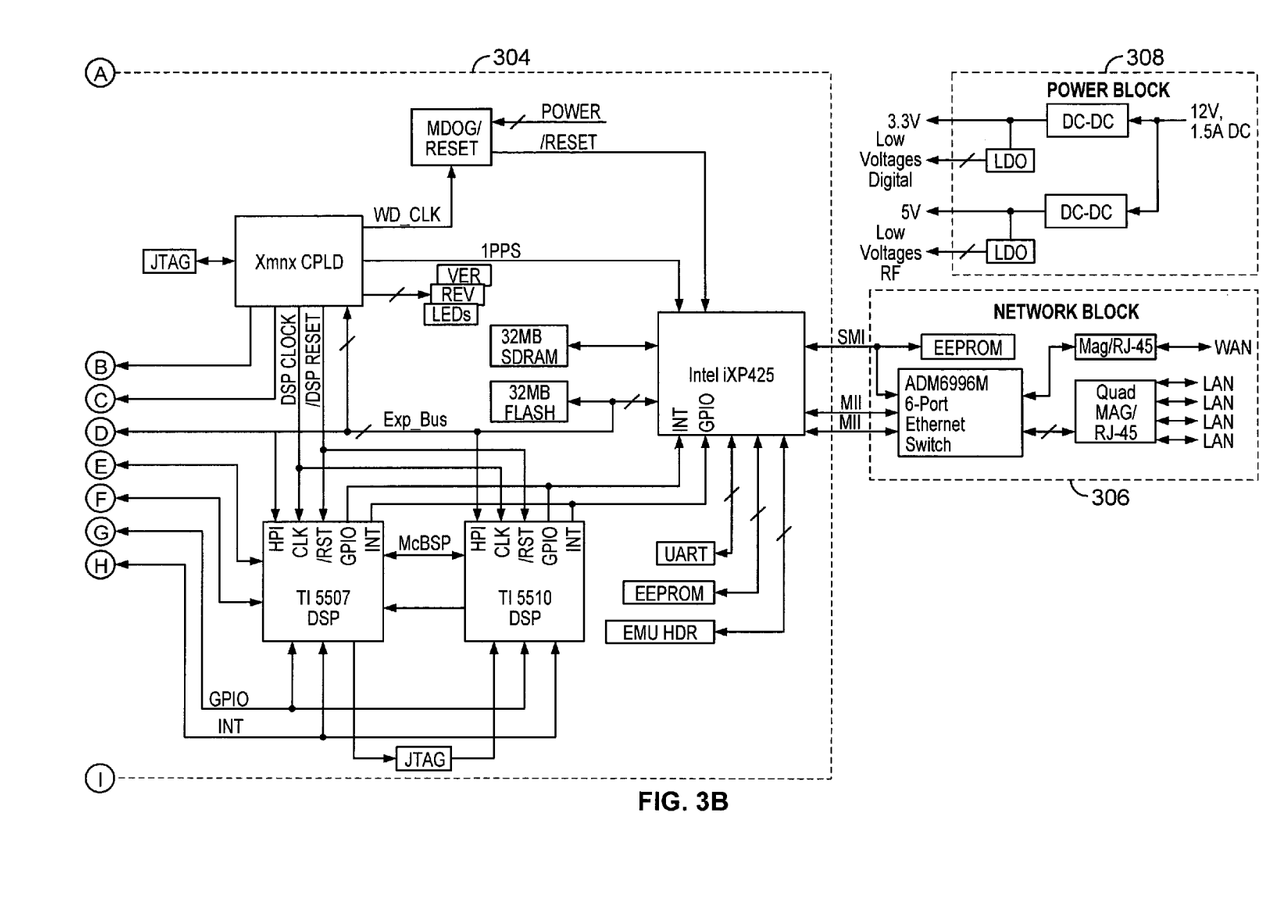

FIGS. 3A-3B is a block diagram illustrating an embodiment of at least a portion of a radio equipment. In some embodiments, the radio equipment includes a BTS. The radio equipment includes RF block 302, baseband block 304, network block 306, and power block 308. RF block 302 includes components for sending and receiving signals. In some embodiments, the radio of FIG. 2 is included in RF block 302. Baseband block includes components for processing the signals received and transmitted by RF block 302. Network block 306 includes components for sending data via a network such as a packet data network. Power block 308 includes components for providing power to the radio equipment.

Figure 4A:
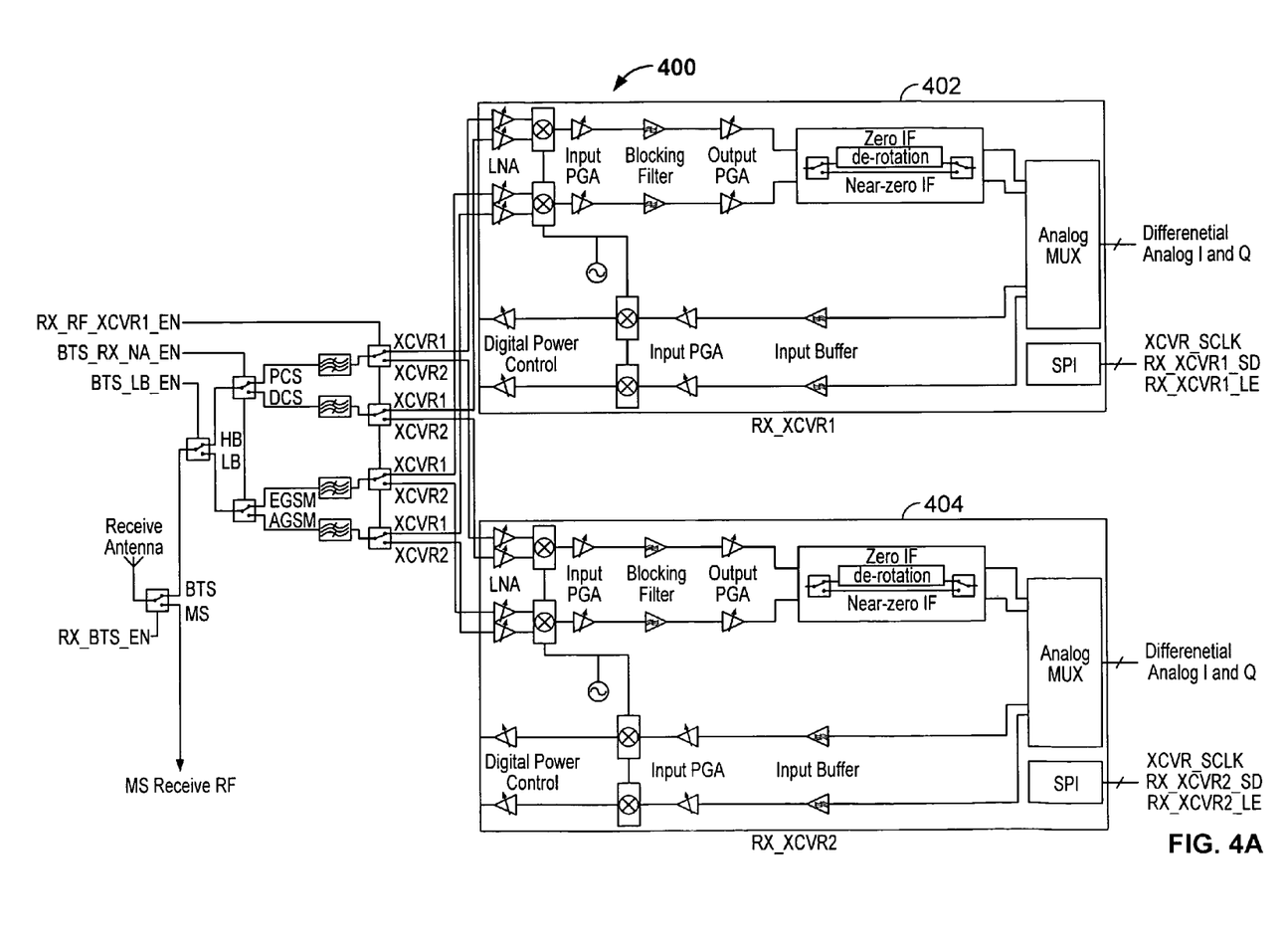
FIG. 4A is a block diagram illustrating an embodiment of a signal receiving portion of a radio.

FIG. 4A is a block diagram illustrating an embodiment of a signal receiving portion of a radio. Components 400 includes two transceiver modules 402 and 404. In some embodiments, transceiver module 202 of FIG. 2 includes transceiver module 402, and transceiver module 204 of FIG. 2 includes transceiver module 404. In some embodiments, the components of FIG. 4A are included in the components of FIG. 2. In some embodiments, at least a portion of components 400 is included in RF block 302 of FIGS. 3A-3B.

Figure 4B:
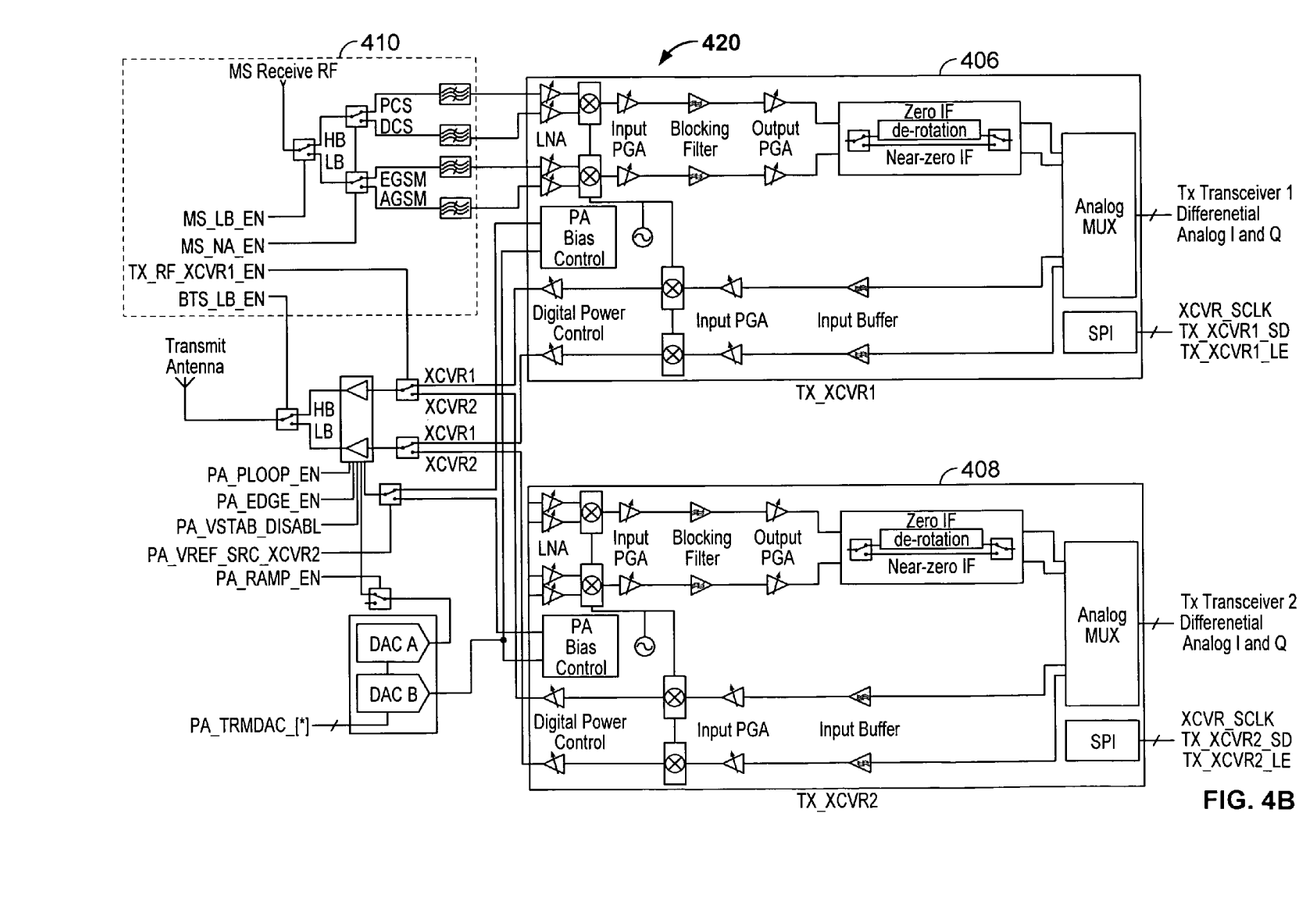
FIG. 4B is a block diagram illustrating an embodiment of a signal transmitting portion of a radio.

FIG. 4B is a block diagram illustrating an embodiment of a signal transmitting portion of a radio. Components 420 includes two transceiver modules 406 and 408. In some embodiments, transceiver module 206 of FIG. 2 includes transceiver module 406, and transceiver module 208 of FIG. 2 includes transceiver module 408. In some embodiments, the components of FIG. 4B are included in the components of FIG. 2. In some embodiments, at least a portion of components 420 is included in RF block 302 of FIGS. 3A-3B. Block 410 outlines components that is used to receive specialized and/or specified information such as radio frequency environment information. In the example shown, transceiver module 406 is used to receive the information of block 410 when transceiver modules 406 and 408 are not being used in transmitting a signal.

Figure 4C:
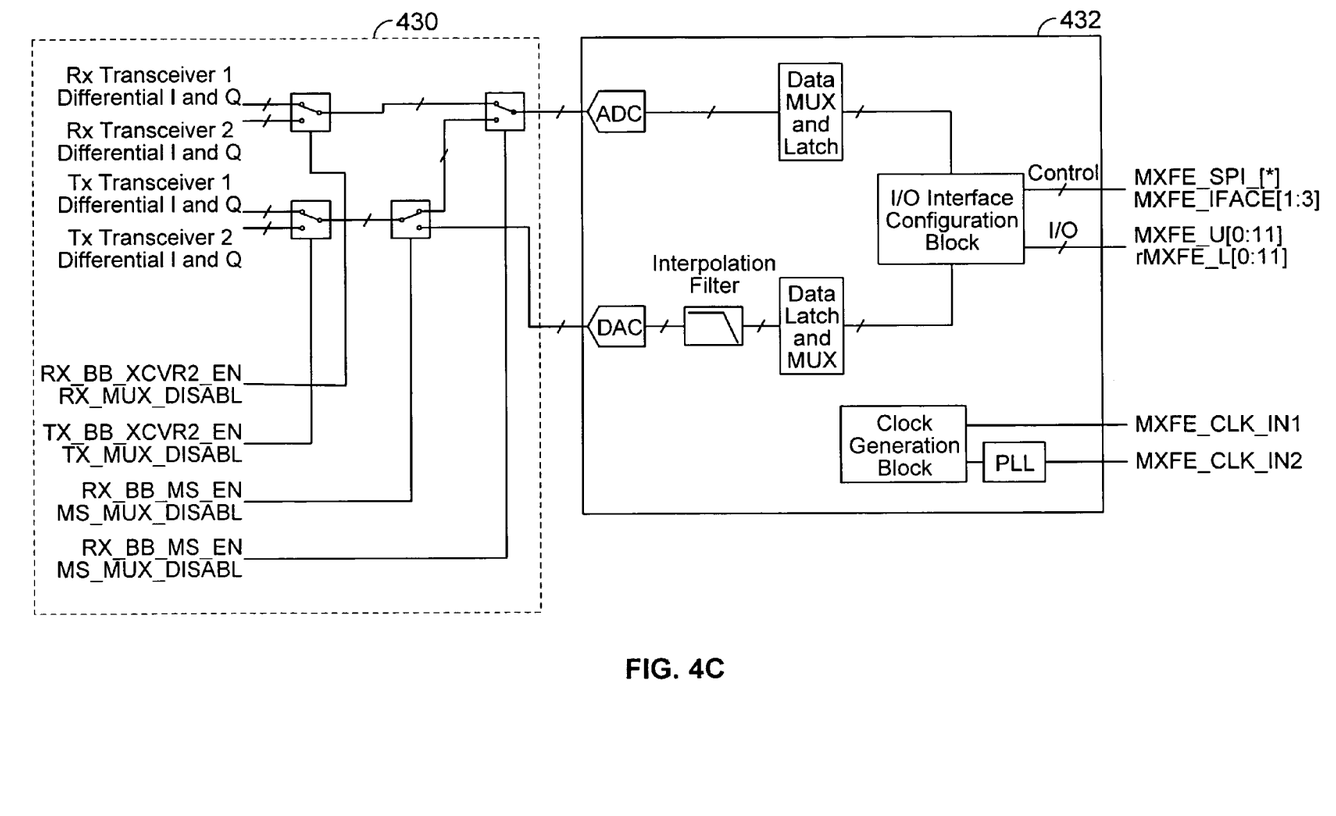
FIG. 4C is a block diagram illustrating an embodiment of a switching and converting portion of a radio.

FIG. 4C is a block diagram illustrating an embodiment of a switching and converting portion of a radio. The portion shown in FIG. 4C includes switch 430 and converter 432. In some embodiments, switch 214 of FIG. 2 includes switch 430, and converter 216 of FIG. 2 includes converter 432. In some embodiments, at least a portion of the components of FIG. 4C are included in RF block 302 of FIGS. 3A-3B.

Figure 5:
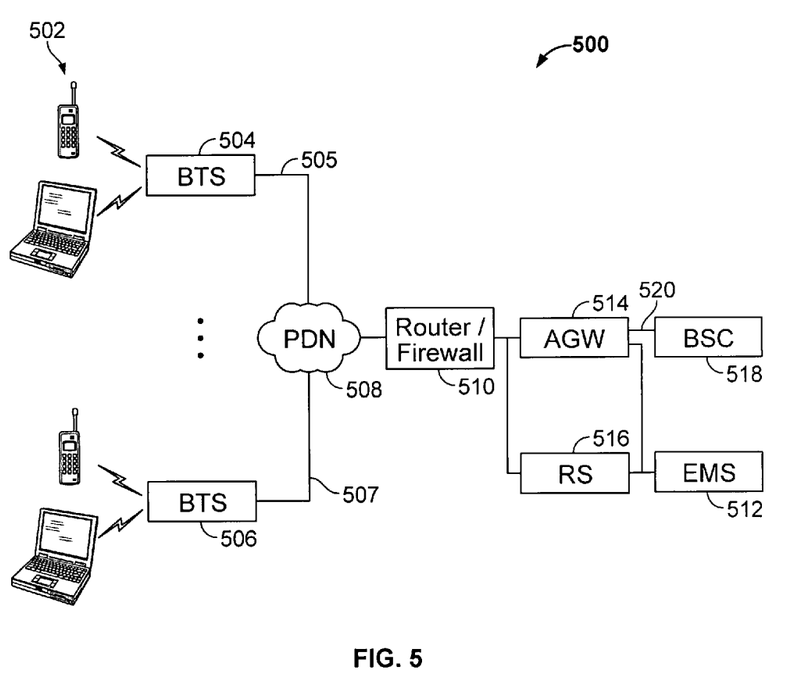
FIG. 5 is a block diagram illustrating an embodiment of a mobile network with packet data network backhaul.

FIG. 5 is a block diagram illustrating an embodiment of a mobile network with packet data network backhaul. In the example shown, the mobile network 500 includes mobile equipment 502 connected to a plurality of base transceiver stations represented in FIG. 5 by BTS 504 and BTS 506. BTS 504 and BTS 506 are connected via a local Internet access connection 505 and 507, respectively, to a packet data network (PDN) 508, such as the Internet. In some embodiments, PDN 508 includes network 104 of FIG. 1. In some embodiments, mobile network data is sent, via PDN 508, between the base transceiver stations represented by BTS 504 and BTS 506, on the one hand, and AGW 514, on the other, using the Internet (IP) protocol. In various embodiments, Internet access connections 505 and 507 comprise a cable, DSL, or other modem collocated with the BTS and/or a local exchange carrier central office (LEC-CO) with DSLAM or cable head-end. Also connected to PDN 508 in the example shown in FIG. 5 is a router/firewall 510 connected to and configured to provide connectivity to and security with respect to an aggregation gateway 514, and a registration server 516. In some embodiments, element management server EMS 512 is connected to router/firewall 510. In some embodiments, router/firewall 510 is omitted and/or does not include a firewall. In various embodiments, element management server 512, an aggregation gateway 514, and a registration server 516 are included in one or more physical computing systems. Element management server 512 enables an administrator to perform operational, administrative, and/or management (OAM) operations with respect to one or more mobile network elements, e.g., BTS 504 or BTS 506. Aggregation gateway (AGW) 514 receives inbound mobile network data (voice, signaling, data, control/management) from one or more base transceiver stations (BTS), via PDN 508, aggregates data from two or more base transceiver stations (if/as applicable), and provides the inbound data to BSC 518 via one or more physical ports, using time division multiplex (TDM) as prescribed by the GSM standard and the BSC OEM's proprietary implementation of the Abis interface 520. In some embodiments, the AGW 514 is capable of interfacing with more than one type of BSC, e.g., with BSC's from two or more vendors. In some such embodiments, the AGW 514 is configured and/or provisioned, e.g., at deployment time, to use the Abis interface API of the particular type of BSC with which it is required to communicate in a particular installation. In some embodiments, an API or other interface specification or definition of the Abis interface as implemented by each BSC vendor/OEM the AGW is desired to be able to support is obtained and used as applicable to configure/provision the AGW to communicate with a particular BSC with which it is required to communicate. In some embodiments, BSC 518 is connected to a PCU, such as PCU 112 of FIG. 1. In some embodiments, AGW 514 is connected to a PCU. For example, BSC 518 is optional, and AGW 514 directly connected to a PCU.

In some embodiments, AGW 514 is configured to present two or more physical base transceiver stations to the BSC as a single logical BTS, to more efficiently use BSC resources in situations in which each BTS serves a relatively small service area and/or number of users. In some embodiments, AGW 514 is configured to map communications received from the BSC to the correct physical BTS and conversely to map communications received from two or more physical base transceiver stations to a single logical BTS prior to forwarding such inbound communications to the BSC.

Registration server 516 is configured to be used to register a BTS and/or other provider equipment with the network, e.g., to authenticate the equipment prior to providing to the equipment session keys to be used in secure communication protocols, identifying (e.g., address) information for other network elements, such as AGW 514, etc. In some embodiments, a physical device, similar to a SIM or other smart card, referred to herein as an equipment identification module (EIM), is provided and installed on a first mobile network equipment, such as a BTS, e.g., at provisioning/configuration time. A secret embodied in the EIM is known to a second equipment associated with the mobile network, e.g., the registration server or other system with which the first mobile network equipment is configured to authenticate itself as part of a registration or similar process, and the first and second equipment use the shared secret to mutually authenticate. Once the first and second equipment have mutually authenticated, in some embodiments the second equipment (e.g., registration server 516) generates and sends to the first equipment via a secure connection a set of keys to be used to send call data securely over the packet data network.

Each BTS in the mobile network 500 shown in FIG. 5 in some embodiments handles only a small fraction of the call volume/load of a conventional BTS, and in such embodiments AGW 514 promotes more efficient use of limited BSC resources. For example, in some embodiments AGW 514 aggregates data associated with multiple base transceiver stations and provides communication to/from the BSC via a fewer number of physical BSC ports (e.g., a single port). In various embodiments, use of PDN 508 and AGW 514 to transport data between base transceiver stations such as BTS 504 and BTS 506, on the one hand, and BSC 518, on the other, makes it commercially feasible to provide a small from factor and/or relatively low capacity BTS for use in remote (e.g., rural) service areas and/or to provide dedicated service to individuals and/or relatively small groups of users, such as a household or small business, since in addition to not requiring a BSC port for each BTS a dedicated T-1/E-1 line is not required.

While the example shown in FIG. 5 and in other embodiments described herein involves a GSM network and/or uses GSM nomenclature to refer to network elements, the techniques described herein are applied in other embodiments to other types of mobile telecommunications networks, and in particular may be applied wherever a plurality of relatively low capacity base transceiver stations need to exchange mobile communication data with a base station controller or other node having a limited number of relatively very high capacity ports or other resources.

Without limiting the generality of the foregoing, the Universal Mobile Telecommunications System (UMTS) is one example of another type of mobile telecommunications network in which the techniques disclosed herein may be applied. In a UMTS network, a W-CDMA air interface (the Uu interface) replaces the GSM air interface shown in FIG. 5. In UMTS, a mobile user employs a user equipment (UE) to communicate via the air (Uu) interface with a base transceiver called a "node B" in UMTS nomenclature, which in some embodiments would replace the BTS 504 and BTS 506 in FIG. 5 for a UMTS implementation. In such an embodiment, a node B (base transceiver) communicates via a packet-based network (e.g., IP network) with the AGW, which aggregates data associated with multiple nodes B and communicates via a third party/proprietary implementation of an interface to a radio network controller (RNC), the Iub interface, which is the equivalent in a UMTS network to a GSM base station controller (BSC), such as BSC 518 of FIG. 5. As used herein, unless specified otherwise, the term "base transceiver station" is used generically to refer to a transceiver and/or associated equipment configured to communication with a mobile (e.g., user) equipment via an air interface to provide connectivity between the mobile equipment and other elements (e.g., a terrestrial portion) of a radio access network, and includes without limitation a GSM BTS and a UMTS node B. Likewise, as used herein, unless specified otherwise, the term "base station controller" is used generically to refer to a controller configured to connect one or more base transceiver stations to a core mobile network, and includes without limitation a GSM BSC and a UMTS RNC.

In some embodiments, at least a portion of the components of FIG. 2 are included BTS 504 and/or BTS 506. In some embodiments, at least a portion of the components of FIGS. 3, 4A, 4B, and/or 4C are included in BTS 504 and/or BTS 506.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for radio communication, comprising:
   a first radio transceiver;
   a second radio transceiver, the first and the second radio transceivers being half-duplex radio transceivers and being individually susceptible to losing a time slot in a transmission sequence due to a frequency hopping setup time or a gain level change setup time;
   a first switch being communicatively disposed between the first and second radio transceivers and an antenna, wherein the first switch is configured to connect one radio transceiver of the first and second radio transceivers to the antenna; and
   a second switch being communicatively disposed between the first and second radio transceivers and a baseband circuitry, wherein the second switch is configured to connect the one radio transceiver of the first and second radio transceivers to the baseband circuitry such that a signal received by or transmitted by the one radio transceiver is communicated to the baseband circuitry through the second switch,
   wherein the first switch and the second switch are configured to switch between the first and second radio transceivers to provide an operational requirement that at least an individual one of the first and second radio transceivers cannot provide alone, and
   wherein the first and second radio transceivers are frequency hopping radio transceivers, and wherein while the first radio transceiver is receiving at a first frequency hopping frequency, the second radio transceiver is preparing to receive at a second frequency hopping frequency, and wherein the first and second switches switch from the first radio transceiver to the second radio transceiver.

2. The system according to claim 1, wherein the operational requirement includes a capability to communicate in full-duplex.

3. The system according to claim 1, wherein, while the first radio transceiver is transmitting at a third frequency hopping frequency, the second radio transceiver is preparing to transmit at a fourth frequency hopping frequency, wherein the first and second switches switch from the first radio transceiver to the second radio transceiver, and wherein the first and second switches provide full-duplex capabilities using the first and second radio transceivers.

4. A system for radio communication, comprising:
   a first radio transceiver;
   a second radio transceiver, the first and the second radio transceivers being half-duplex radio transceivers and being individually susceptible to losing a time slot in a transmission sequence due to a frequency hopping setup time or a gain level change setup time;
   a first switch being communicatively disposed between the first and second radio transceivers and an antenna, wherein the first switch is configured to connect one radio transceiver of the first and second radio transceivers to the antenna; and
   a second switch being communicatively disposed between the first and second radio transceivers and a baseband circuitry, wherein the second switch is configured to connect the one radio transceiver of the first and second radio transceivers to the baseband circuitry such that a signal received by or transmitted by the one radio transceiver is communicated to the baseband circuitry through the second switch, wherein the first switch and the second switch are configured to switch between the first and second radio transceivers to provide an operational requirement that at least an individual one of the first and second radio transceivers cannot provide alone, and wherein the operational requirement includes a required frequency hopping performance that includes a shorter setup time to change a transmission frequency or a receive frequency than possible by only using one of the first and second radio transceivers.

5. The system according to claim 1, wherein the operational requirement includes a capability to change a transmission frequency or a receive frequency without a blind spot.

6. The system according to claim 1, wherein while the first radio transceiver is receiving a signal in an original frequency, the second radio transceiver is configured to prepare to receive a signal in a specified new frequency.

7. The system according to claim 6, wherein when the signal in the specified new frequency is desired to be received, the first switch is configured to change from providing a received radio signal to the first radio transceiver to providing the received radio signal to the second radio transceiver.

8. A system for radio communication comprising:
a first radio transceiver;
a second radio transceiver, the first and the second radio transceivers being half-duplex radio transceivers and being individually susceptible to losing a time slot in a transmission sequence due to a frequency hopping setup time or a gain level change setup time;
a first switch being communicatively disposed between the first and second radio transceivers and an antenna, wherein the first switch is configured to connect one radio transceiver of the first and second radio transceivers to the antenna; and
a second switch being communicatively disposed between the first and second radio transceivers and a baseband circuitry, wherein the second switch is configured to connect the one radio transceiver of the first and second radio transceivers to the baseband circuitry such that a signal received by or transmitted by the one radio transceiver is communicated to the baseband circuitry through the second switch,
wherein the first switch and the second switch are configured to switch between the first and second radio transceivers to provide an operational requirement that at least an individual one of the first and second radio transceivers cannot provide alone, and
wherein the operational requirement includes a required gain level change performance that includes a shorter setup time to change a transceiver gain level than possible by using only one of the first and second radio transceivers.

9. A system for radio communication, comprising:
a first radio transceiver;
a second radio transceiver, the first and the second radio transceivers being half-duplex radio transceivers and being individually susceptible to losing a time slot in a transmission sequence due to a frequency hopping setup time or a gain level change setup time;
a first switch being communicatively disposed between the first and second radio transceivers and an antenna, wherein the first switch is configured to connect one radio transceiver of the first and second radio transceivers to the antenna; and
a second switch being communicatively disposed between the first and second radio transceivers and a baseband circuitry, wherein the second switch is configured to connect the one radio transceiver of the first and second radio transceivers to the baseband circuitry such that a signal received by or transmitted by the one radio transceiver is communicated to the baseband circuitry through the second switch,
wherein the first switch and the second switch are configured to switch between the first and second radio transceivers to provide an operational requirement that at least an individual one of the first and second radio transceivers cannot provide alone, and
wherein while the first radio transceiver is receiving a signal in an original gain level, the second radio transceiver is configured to prepare to receive a signal in a specified new gain level.

10. The system according to claim 9, wherein when the signal in the specified new gain level is desired to be received, the first switch is configured to change from providing a received radio signal to the first radio transceiver to providing the received radio signal to the second radio transceiver.

11. The system according to claim 1, wherein the operational requirement includes two or more of the following requirements: a capability to communicate in full-duplex, a required frequency hopping performance, and a required gain level change performance.

12. The system according to claim 1, wherein the operational requirement includes a capability to communicate in full-duplex, a required frequency hopping performance, and a required gain level change performance.

13. The system according to claim 1, wherein the first and second switches are configured to provide the operational requirement by switching between the first and second radio transceivers receiving at least a portion of a signal.

14. The system according to claim 1, wherein the first and second switches are configured to provide the operational requirement by switching between the first and second radio transceivers transmitting at least a portion of a signal.

15. The system according to claim 1, wherein the first and second switches are controlled by one or more of the following: a digital signal processor and a microprocessor.

16. The system according to claim 1, further comprising a third radio transceiver, a fourth radio transceiver, and a third switch being communicatively disposed between a second antenna and the baseband circuitry.

17. The system according to claim 1, wherein at least one the first and second radio transceivers comprises a commodity mobile handset chip.

18. The system according to claim 1, wherein the system is included in a cellular communication network component.

19. The system according to claim 1, wherein the system is included in a Base Transceiver Station.

20. The system according to claim 19, wherein the Base Transceiver Station is a Base Transceiver Station suitable for deployment in a home or enterprise setting.

21. The system according to claim 19, wherein the Base Transceiver Station communicates with a cellular communication network component via a packet data network backhaul.

22. The system according to claim 1, wherein the operational requirement includes a capability to communicate with multiple mobile stations and shift between transceiver frequencies without a blind spot.

23. The system according to claim 1, wherein at least one of the plurality of radio transceivers includes a quad-band radio frequency (RF) transceiver designed for use with one or more of the following communication standards: a Global System for Mobile Communications (GSM) standard, a General Packet Radio Service (GPRS) standard, and an Enhanced Data Rates for GSM Evolution (EDGE) standard.

24. The system according to claim 1, wherein the system is a base transceiver station.

\* \* \* \* \*

UNITED STATES PATENT AND TRADEMARK OFFICE
CERTIFICATE OF CORRECTION

PATENT NO.        : 8,670,356 B1
APPLICATION NO.   : 11/715673
DATED             : March 11, 2014
INVENTOR(S)       : Keese et al.

It is certified that error appears in the above-identified patent and that said Letters Patent is hereby corrected as shown below:

In the Claims

Column 10, line 45, claim 17, please replace "at least one" with --at least one of--.

Signed and Sealed this
First Day of July, 2014

Michelle K. Lee
*Deputy Director of the United States Patent and Trademark Office*